(12) United States Patent
Citurs et al.

(10) Patent No.: US 12,255,566 B2
(45) Date of Patent: Mar. 18, 2025

(54) OVERCURRENT PROTECTION FOR IRRIGATION SYSTEM MOTORS

(71) Applicant: LINDSAY CORPORATION, Omaha, NE (US)

(72) Inventors: Arnel Berton Citurs, Omaha, NE (US); Mark William Miller, Elkhorn, NE (US)

(73) Assignee: LINDSAY CORPORATION, Omaha, NE (US)

( * ) Notice: Subject to any disclaimer, the term of this patent is extended or adjusted under 35 U.S.C. 154(b) by 627 days.

(21) Appl. No.: 17/562,106

(22) Filed: Dec. 27, 2021

(65) Prior Publication Data

US 2023/0208341 A1 Jun. 29, 2023

(51) Int. Cl.
*H02P 29/024* (2016.01)
*A01G 25/09* (2006.01)
*H02P 29/028* (2016.01)

(52) U.S. Cl.
CPC .......... *H02P 29/027* (2013.01); *A01G 25/092* (2013.01); *H02P 29/028* (2013.01)

(58) Field of Classification Search
CPC ... A01G 25/092; H02P 29/027; H02P 29/028; H02P 5/74
See application file for complete search history.

(56) References Cited

U.S. PATENT DOCUMENTS

| 3,780,947 | A | * | 12/1973 | Ririe | A01G 25/092 239/731 |
| 3,807,436 | A | * | 4/1974 | Pringle | A01G 25/092 239/731 |
| 4,833,592 | A | | 5/1989 | Yamanaka | |
| 5,675,231 | A | * | 10/1997 | Becerra | H02P 7/0094 318/400.4 |
| 6,055,145 | A | | 4/2000 | Lagree et al. | |
| 7,245,991 | B1 | * | 7/2007 | Woytowitz | A01G 25/16 239/69 |
| 7,254,001 | B2 | | 8/2007 | Papallo et al. | |

(Continued)

FOREIGN PATENT DOCUMENTS

WO 2021/231371 11/2021

OTHER PUBLICATIONS

International Search Report and Written Opinion mailed Apr. 17, 2023 in related PCT Application No. PCT/US2022/082126, 8 pages.

(Continued)

*Primary Examiner* — Vincent H Tran
(74) *Attorney, Agent, or Firm* — HOVEY WILLIAMS LLP (57) ABSTRACT

An overcurrent protection system for a mobile irrigation system. The overcurrent protection system includes a number of control panels each including a controller configured to generate a motor control signal for activating one of the motors of the mobile irrigation system, transmit the motor control signal to the motor, determine a current magnitude of electrical current passing through a motor power branch line electrically connected to the motor, and restrict current to the motor if the current magnitude is above a current magnitude threshold. The controller is further configured to set the current magnitude threshold according to one of a plurality of motor operation stages. The current magnitude threshold can also be set remotely.

19 Claims, 2 Drawing Sheets

(56) References Cited

U.S. PATENT DOCUMENTS

| | | | | |
|---|---|---|---|---|
| 7,949,433 | B2 | 5/2011 | Hern et al. | |
| 8,559,150 | B2* | 10/2013 | Veroni | H02J 3/14 |
| | | | | 361/42 |
| 10,120,398 | B2* | 11/2018 | Illing | G05F 1/10 |
| 10,381,970 | B2 | 8/2019 | Parod et al. | |
| 11,357,180 | B2 | 6/2022 | Stouffer et al. | |
| 11,483,987 | B2 | 11/2022 | Thatcher et al. | |
| 11,539,204 | B1* | 12/2022 | Dixit | H02H 1/0007 |
| 2002/0107582 | A1 | 8/2002 | Pollak et al. | |
| 2004/0063446 | A1 | 4/2004 | Kennett | |
| 2004/0085110 | A1* | 5/2004 | Gunton | H01H 9/548 |
| | | | | 327/170 |
| 2005/0123408 | A1* | 6/2005 | Koehl | F04D 15/0066 |
| | | | | 417/53 |
| 2013/0018509 | A1* | 1/2013 | Korus | A01G 25/16 |
| | | | | 700/275 |
| 2017/0148280 | A1* | 5/2017 | DeSalle | H04W 4/14 |
| 2018/0175780 | A1* | 6/2018 | Hall | E05F 15/605 |
| 2018/0335455 | A1* | 11/2018 | Xiang | G01R 31/2801 |
| 2019/0165716 | A1* | 5/2019 | Parod | H02P 29/662 |
| 2020/0259413 | A1* | 8/2020 | Lau | H02P 25/092 |
| 2020/0383283 | A1* | 12/2020 | Thatcher | G05B 13/0265 |
| 2021/0076579 | A1* | 3/2021 | Thatcher | A01G 25/16 |
| 2021/0175622 | A1* | 6/2021 | Jing | H02P 27/08 |
| 2022/0069749 | A1* | 3/2022 | Leman | H02P 6/182 |

OTHER PUBLICATIONS

Webpage: http://www.ijcns.com/pdf/ijpcsc16.pdf; titled "Embedded Based Remote Control Application Using Mobile Phone in Irrigation"; International Journal of Power Control Signal and Computation; vol. 3. No. 1, Jan.-May 1012.

* cited by examiner

OVERCURRENT PROTECTION FOR IRRIGATION SYSTEM MOTORS

BACKGROUND

Mobile irrigation systems include fuses, circuit breakers, or overload relays for protecting their motors against current overloads. Fuses and circuit breakers provide a fixed level of overcurrent protection and must be physically replaced to change the level of overcurrent protection. Some overload relays are adjustable but they must be adjusted manually onsite.

SUMMARY

Embodiments of the present invention solve the above-mentioned problems and other problems and provide a distinct advancement in the art of mobile irrigation systems. More particularly, the invention provides a mobile irrigation system that includes more versatile and dynamically adjustable overcurrent protection for its motors, pumps, and other electromechanical components, and electronic components.

An embodiment of the invention is a mobile irrigation system broadly comprising a central pivot, a number of spans, an electrical power distribution system, and an overcurrent protection system. The overcurrent protection system guards against harmful excessive electrical current draw in the electrical power distribution system.

The central pivot may be a tower, a standpipe, or the like. The central pivot may include a support structure for withstanding radial loads, axial loads, and twisting loads, a non-rotatable vertically extending pipe, and a rotatable elbow.

The spans include a number of truss sections, a number of conduit sections, and a number of mobile irrigation towers. Any number of spans may be used without departing from the scope of the present invention. To that point, spans may be added and removed as an area to be irrigated is increased or decreased.

Each truss section includes a number of beams rigidly connected to one another to form a framework which carries or otherwise supports the conduit sections and other fluid distribution mechanisms that are connected in fluid communication to the conduit. The truss sections may include braces, cross members, cables, and the like.

The conduit sections are connected end-to-end on the truss sections. The conduit sections transport water or other fluids to a number of sprinklers, spray guns, drop nozzles, or other fluid emitting devices spaced along the conduit sections.

Each of the mobile irrigation towers elevates adjacent truss sections and may include an "A-frame" or similar structure, a number of wheels, and a drive motor. Each mobile irrigation tower may also include a controller for activating its drive motor.

The wheels may include conventional circular wheels, skis, skids, tank tracks and wheels, rollers on a track, or any mechanism on which the mobile irrigation towers may travel relative to the ground. In one embodiment, one of every pair of wheels is drivably connected to one of the drive motors and the other wheel is free-spinning.

The drive motors may be constant speed or variable speed electric motors. In some embodiments of the invention, the drive motors may include integral or external relays so they may be turned on, off, and/or reversed. The drive motors are drivably connected to one of the wheels via a drive train including a geared transmission, a variable gear ratio transmission, a continuously variable transmission (CVT), or the like.

The electrical power distribution system includes a number of electrical power distribution lines and a number of drive motor power branch lines and a number of pump motor branch lines. In addition to the drive motors, the electrical power distribution system may provide power to irrigation system monitoring sensors, agricultural data acquisition sensors, on-board data processors, remote communication elements such as transceivers and antennas, and the like.

The electrical power distribution lines connect to a power grid or line power and extend from a main control panel to the mobile irrigation towers. In one embodiment, three electrical power distribution lines are used for accommodating three-phase electrical power.

The drive motor power branch lines connect the electrical power distribution lines to the drive motors. In one embodiment, three drive motor power branch lines are used per motor.

The overcurrent protection system comprises a main control panel, a number of tower control panels, and a wireless communication element. The overcurrent protection system provides dynamic, controllable, and programmable overcurrent protection to the drive motors, pumps, and other electrical and electro-mechanical components of the mobile irrigation system.

The main control panel includes a number of fuses for providing electrical power distribution line protection. The main control panel may also include a controller for generating irrigation system control signals, running irrigation system management programs, communicating with the tower control panels, and the like.

The fuses may be wired to the electrical power distribution lines and may have ratings of between 15 amps and 45 amps (e.g., Class CC to Class J fuses). In one embodiment, one fuse is used each of the electrical power distribution lines.

Each tower control panel includes a controller, a number of current measurement sensors, an ambient temperature sensor, and a number of motor controllers. The tower control panels may be mounted on the mobile irrigation towers or on the corresponding spans.

The controller may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The controller may generally execute, process, or run instructions, code, code segments, code statements, software, firmware, programs, applications, apps, processes, services, daemons, or the like.

The current measurement sensors are coupled to the controller and are configured to detect current in the drive motor power branch lines. The current measurement sensors may detect amperage, impedance, inductance, resistance, heat, or any other measurable aspect related to electrical power use.

The ambient temperature sensor is coupled to the controller and is configured to detect an ambient temperature near the drive motor. The ambient temperature sensor may be a thermocouple, a thermistor, or any other suitable electrical temperature gauge.

The motor controllers may be relays or other electrical switches and are communicatively coupled to the controller. Alternatively, motor soft starts or variable frequency drives (VFDs) may be used. The motor controllers may be electrically downstream from sensing points of the current measurement sensors.

The wireless communication element may include signal and/or data transmitting and receiving circuits, such as antennas, amplifiers, filters, mixers, oscillators, digital signal processors (DSPs), and the like. The wireless communication element may establish communication between controllers of the overcurrent protection system, other controllers of the mobile irrigation system, and remote computing devices over a communication network.

In use, the drive motors, pumps, other electromechanical components, and electronic components of the mobile irrigation system may draw high current in a startup stage and other stages. For example, a drive motor may draw high current through the electrical power distribution lines and drive motor power branch lines in its startup stage. The controller of the corresponding tower control panel may then detect an amount of current or current level in the drive motor power branch lines via the current measurement sensors. The controller may then compare the amount of current in one of the drive motor power branch lines to a threshold value. If the current amount is greater than the threshold value, the tower control panel may then open the motor controllers, thus cutting power to the drive motor.

The controller may increase the threshold value for stages in which the drive motor draws a high amount of current to avoid increasing the risk of "false overcurrent events" (i.e., incidents in which overcurrent protection is unnecessarily triggered). The threshold value may also follow a function over time and may be increased discretely or according to a continuous curve.

The controller may also change the threshold value according to ambient temperature as measured by the ambient temperature sensor. For example, the threshold value may be decreased if the ambient temperature is high, and the threshold value may be increased if the ambient temperature is low. In this way, the controller can compensate for less efficient cooling at high ambient temperatures and take advantage of more efficient cooling at low ambient temperatures.

The controllers can be adjusted either locally or remotely programmed from remote or personal computing devices communicatively connected to the controllers via the wireless communication elements. The controllers may also communicate with the remote or personal computing devices to report electrical performance, power consumption, false or warranted overcurrent events and other faults, and other information. The overcurrent protection system may be hardwired or wirelessly connected to a Machine-to-Machine (M2M) system for integration into other irrigation control and agricultural management systems. This may be utilized to transmit notifications to a remote user including information such as overcurrent event location, motor identity corresponding to the overcurrent event, and extent or magnitude of the overcurrent event.

The above-described irrigation system and overcurrent protection system provides several advantages. For example, the likelihood of false overcurrent events is reduced by increasing current thresholds during high current draw motor operating stages and changing current thresholds according to ambient temperature. The overcurrent protection system also eliminates the need for certain fuses depending on regulatory requirements. This improved performance is not possible with conventional fuses, circuit brakers, and overload-relay based systems.

The overcurrent protection system eliminates the need to reset circuit breakers in the event of an overcurrent event. Instead, the motor affected by the overcurrent event may be turned off at the onset of the surge in current. The motor can then be restarted after the overcurrent event.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 1:
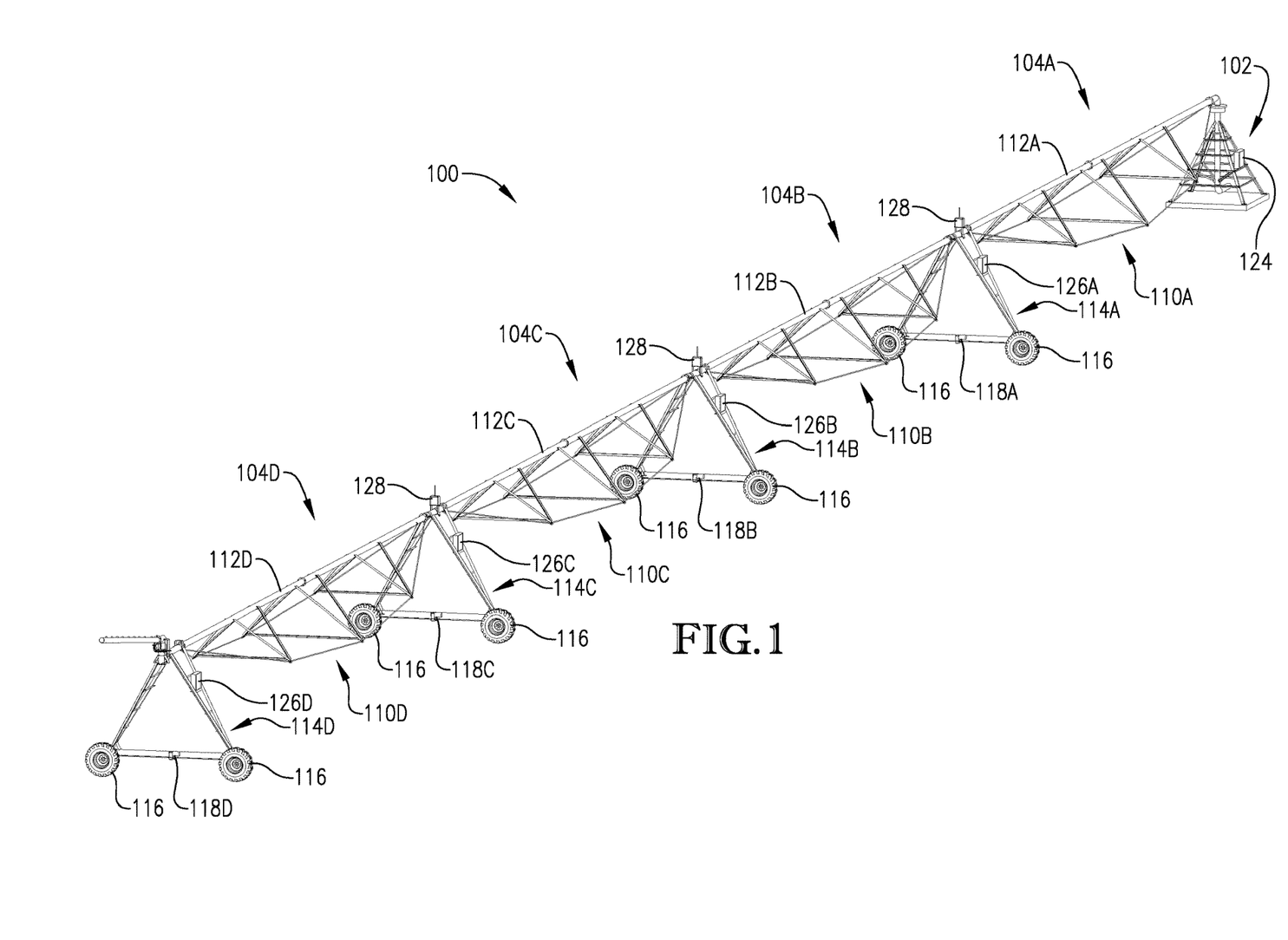
FIG. 1 is a perspective view of an irrigation system including an overcurrent protection system constructed in accordance with an embodiment of the invention.
Figure 2:
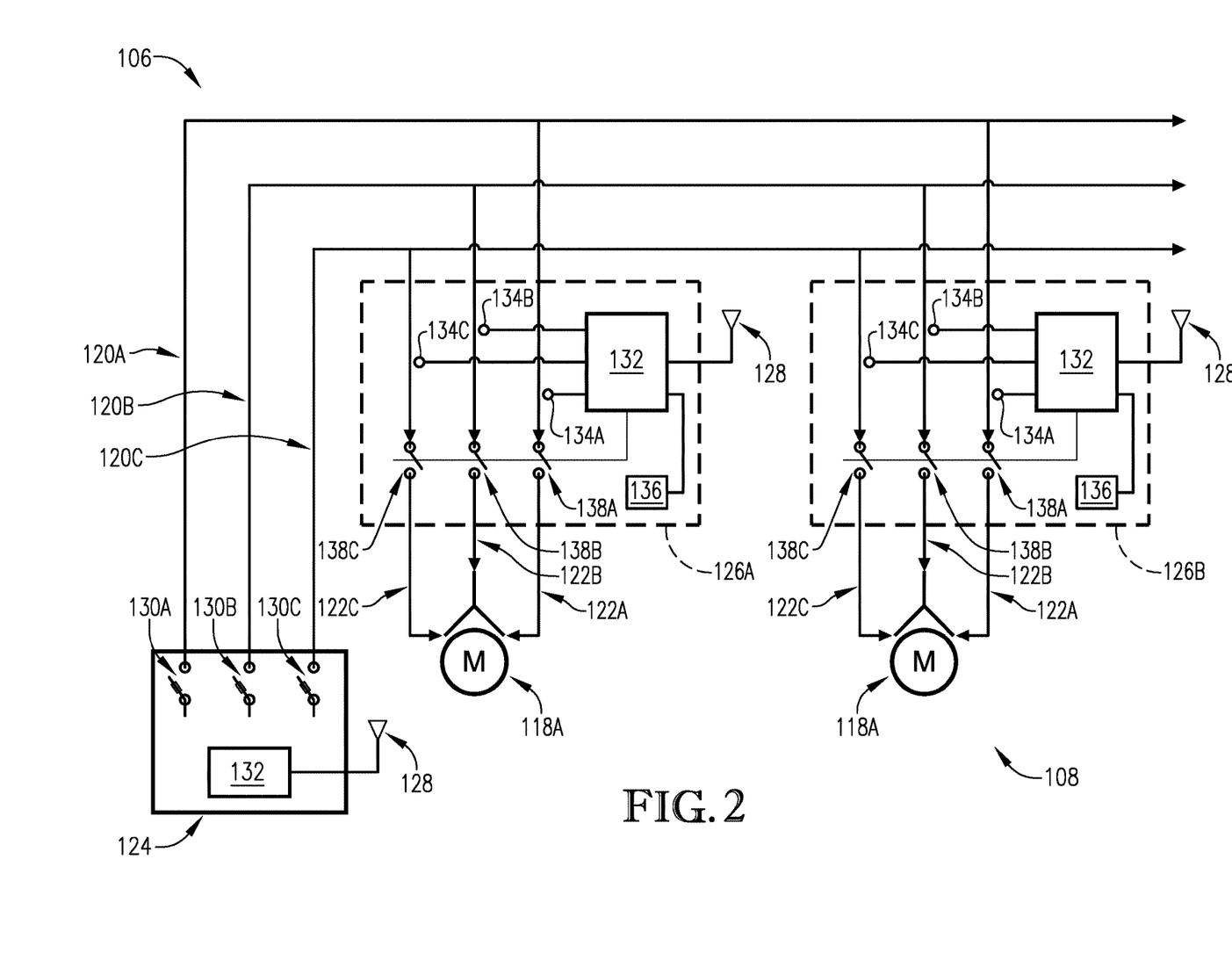
FIG. 2 is a schematic diagram of the overcurrent protection system of FIG. 1.

Turning to the drawing figures, a mobile irrigation system 100 constructed in accordance with various embodiments of the invention is illustrated. The mobile irrigation system 100 is a central pivot irrigation system broadly comprising a central pivot 102, a plurality of spans 104A-D, an electrical power distribution system 106, and an overcurrent protection system 108. Other irrigation systems such as linear move irrigation systems may also be used without departing from the scope of the invention.

The central pivot 102 distributes water or other fluids to the spans 104A-D and may be a tower, a standpipe, or the like. The central pivot 102 may include a support structure for withstanding radial loads, axial loads, and twisting loads, a non-rotatable vertically extending pipe, and a rotatable elbow. The non-rotatable vertically extending pipe carries the fluids to an elevated height. The rotatable elbow connects the first span 104A to the non-rotatable vertically extending pipe such that the spans 104A-D are free to pivot about the central pivot 102 while remaining connected thereto.

The plurality of spans 104A-D include a plurality of truss sections 110A-D, a plurality of conduit sections 112A-D, and a plurality of mobile irrigation towers 114A-D. Any number of spans may be used without departing from the scope of the present invention. To that point, spans may be added and removed as an area to be irrigated is increased or decreased.

Each of the truss sections 110A-D provides rigidity to or otherwise supports one of the conduit sections 112A-D. The truss sections 110A-D may include braces, cross members, cables, and the like.

Each of the conduit sections 112A-D transport water or other fluids to a plurality of sprinklers, spray guns, drop nozzles, or other fluid emitting devices spaced along the conduit sections 112A-D to apply water and/or other fluids to areas underneath the irrigation system 100. The conduit sections 112A-D may be or may include metal pipes and flexible liners including outlets to which the fluid emitting devices are connected.

Each of the mobile irrigation towers 114A-D elevates adjacent truss sections 110A-D and may include an "A-frame" or similar structure, a number of wheels 116, and a drive motor 118A-D. Each mobile irrigation tower 114A-D may also include a controller for activating the drive motor 118A-D according to a position of the mobile irrigation tower 114A-D or a relative angle of the adjacent span 104A-D.

The wheels 116 illustrated and described herein are merely examples of mechanisms for permitting movement of the mobile irrigation system 100. The term "wheel" or "wheels" as used herein may refer to conventional circular wheels, skis, skids, tank tracks and wheels, rollers on a track, or any mechanism on which the mobile irrigation towers may travel relative to the ground. In one embodiment, each mobile irrigation tower 114A-D includes a pair of wheels with one wheel being drivably connected to one of the drive motors 118A-D and the other wheel free-spinning.

The drive motors 118A-D are substantially similar, so only drive motor 118A will be described further. The drive motor 118A may be a constant speed or variable speed electric motor. In some embodiments of the invention, the drive motor 118A may include integral or external relays so they may be turned on, off, and/or reversed. The drive motor 118A may be drivably connected to one of the wheels 116 via a drive train including a geared transmission, a variable gear ratio transmission, a continuously variable transmission (CVT), or the like.

The mobile irrigation system 100 may also include a plurality of pumps and electric pump motors irrigation system monitoring sensors, agricultural data acquisition sensors, on-board data processors, remote communication elements such as transceivers and antennas, and the like. The electrical power distribution system 106 and overcurrent protection system 108 is primarily described in terms of providing electrical power and protection to the drive motors 118A-D, but other electrical components such as the ones listed above may also benefit from the present invention.

The electrical power distribution system 106 may include a plurality of electrical power distribution lines 120A-C and a plurality of drive motor power branch lines 122A-C. In addition to the drive motors 118A-D, the electrical power distribution system 106 may provide power to pump motors, irrigation system monitoring sensors, agricultural data acquisition sensors, on-board data processors, remote communication elements such as transceivers and antennas, and the like. To that end, the electrical power distribution system 106 may also include a plurality of pump motor power branch lines for providing power to pump motors for example.

The electrical power distribution lines 120A-C may connect to a power grid or line power at or near the central pivot 102 and extend from a main control panel to the mobile irrigation towers 114A-D. Three electrical power distribution lines 120A-C are shown for accommodating three-phase electrical power, but other numbers or configurations of distribution lines, including ground lines, may be used.

The drive motor power branch lines 122A-C may connect the electrical power distribution lines 120A-C to the drive motors 118A-D. Similar to the electrical power distribution lines 120A-C, three drive motor power branch lines 122A-C are shown for accommodating three-phase electrical power, but other numbers or configurations of drive motor power branch lines, including ground lines, may be used.

The overcurrent protection system 108 provides dynamic, controllable, and programmable overcurrent protection to the drive motors 118A-D, pumps, and other electrical and electro-mechanical components of the mobile irrigation system 100 and comprises a main control panel 124, a plurality of tower control panels 126A-D, and may include a wireless communication element 128.

The main control panel 124 includes a plurality of fuses 130A-C for providing electrical power distribution line protection. The main control panel 124 may also include a controller (similar to the controllers described below) for generating irrigation system control signals, running irrigation system management programs, communicating with the tower control panels 126A-D, and the like.

The fuses 130A-C may be wired to the electrical power distribution lines 120A-C and may have ratings of between 15 amps and 45 amps (e.g., Class CC to Class J fuses). One of the fuses 130A-C is shown for each of the electrical power distribution lines 120A-C, but other numbers or configurations of fuses may be used.

The tower control panels 126A-D are substantially similar and thus only tower control panel 126A-D will be described further. Tower control panel 126A includes a controller 132, a plurality of current measurement sensors 134A-C, and may include an ambient temperature sensor 136, and a plurality of motor controllers 138A-C. The tower control panels 126A-D may be mounted on the mobile irrigation towers 114A-D or on the corresponding spans 104A-D.

The controller 132 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The controller 132 may generally execute, process, or run instructions, code, code segments, code statements, software, firmware, programs, applications, apps, processes, services, daemons, or the like. The controller 132 may also include hardware components such as registers, finite-state machines, sequential and combinational logic, configurable logic blocks, and other electronic circuits that can perform the functions necessary for the operation of the current invention. In certain embodiments, the controller 132 may include multiple computational components and functional blocks that are packaged separately but function as a single unit. The controller 132 may be in electronic communication with the other electronic components through serial or parallel links that include universal busses, address busses, data busses, control lines, and the like.

The controller 132 may include, perhaps as an embedded device or an integrated device, or be in electronic communication with, a memory element. The memory element may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element may be embedded in, or packaged in the same package as, the controller. The memory element may include, or may constitute, a non-transitory "computer-readable medium". The memory element may store the instructions, code, code statements, code segments, software, firmware, programs, applications, apps, services, daemons, or the like that are executed by the controller. The memory element may also store data that is received by the controller 132 or the device in which the controller 132 is implemented. The controller 132 may further store data or intermediate results generated during processing, calculations, and/or computations as well as data or final results after processing, calculations, and/or computations. In addition, the memory element may store settings, data, documents, sound files, photographs, movies, images, databases, and the like.

The current measurement sensors 134A-C may be coupled to the controller 132 and are configured to detect current in the drive motor power branch lines 122A-C. The current measurement sensors 134A-C may detect amperage, impedance, inductance, resistance, heat, or any other measurable aspect related to electrical power use.

The ambient temperature sensor 136 may be coupled to the controller 132 and is configured to detect an ambient temperature near the drive motor 118A. The ambient temperature sensor 136 may be a thermocouple, a thermistor, or any other suitable electrical temperature gauge.

The motor controllers 138A-C may be relays or other electrical switches and are communicatively coupled to the controller 132. Alternatively, motor soft starts or variable frequency drives (VFDs) or solid state motor starters may be used. The motor controllers 138A-C may be electrically downstream from sensing points of the current measurement sensors 134A-C.

The wireless communication element 128 may include signal and/or data transmitting and receiving circuits, such as antennas, amplifiers, filters, mixers, oscillators, digital signal processors (DSPs), and the like. The wireless communication element 128 may establish communication wirelessly by utilizing radio frequency (RF) signals and/or data that comply with communication standards such as cellular 2G, 3G, 4G, Voice over Internet Protocol (VoIP), LTE, Voice over LTE (VoLTE), or 5G, Institute of Electrical and Electronics Engineers (IEEE) 802.11 standard such as WiFi, IEEE 802.16 standard such as WiMAX, Bluetooth™, or combinations thereof.

Use of the mobile irrigation system 100 will now be described in more detail. First, the mobile irrigation system 100 may receive an instruction to initiate an irrigation plan. This may require the tower control panel 126A to send a signal to the corresponding drive motor 118A to start up in a startup stage. The drive motor 118A may draw high current through the electrical power distribution lines 120A-C and drive motor power branch lines 122A-C in the startup stage. The controller 132 of the tower control panel 126A may then detect an amount of current or current level in the drive motor power branch lines 122A-C via the current measurement sensors 134A-C. The controller 132 may then compare the amount of current in one of the drive motor power branch lines 122A-C to a threshold value. If the current amount is greater than the threshold value, the tower control panel 126A may then open the motor controllers 138A-C, thus cutting power to the drive motor 118A.

In addition to the startup stage, the drive motor 118A may need to draw a high amount of current during accelerating stages and certain other stages. To accommodate such acceptable high current draw and avoid increasing the risk of "false overcurrent events" (i.e., incidents in which overcurrent protection is unnecessarily triggered), the controller 132 may increase the threshold value for stages in which the drive motor 118A draws a high amount of current. The threshold value may also follow a function over time and may be increased discretely or according to a continuous curve.

The controller 132 may also change the threshold value according to ambient temperature as measured by the ambient temperature sensor 136. For example, the threshold value may be decreased if the ambient temperature is high, and the threshold value may be increased if the ambient temperature is low. In this way, the controller 132 can compensate for less efficient cooling at high ambient temperatures and take advantage of more efficient cooling at low ambient temperatures.

The overcurrent protection system 108 may also be used for protecting pump motors, end gun motors, sensitive electronic control components, and the like. The controllers 132 can be adjusted either locally or remotely programmed from remote or personal computing devices communicatively connected to the controllers 132 via the wireless communication elements 128. The controllers may also communicate with the remote or personal computing devices to report electrical performance, power consumption, false or warranted overcurrent events and other faults, and other information. The overcurrent protection system 108 may be hardwired or wirelessly connected to a Machine-to-Machine (M2M) system for integration into other irrigation control and agricultural management systems. This may be utilized to transmit notifications to a remote user including information such as overcurrent event location, motor identity corresponding to the overcurrent event, and extent or magnitude of the overcurrent event.

The above-described irrigation system 100 and overcurrent protection system 108 provides several advantages. For example, the likelihood of false overcurrent events is reduced by increasing current thresholds during high current draw motor operating stages and changing current thresholds according to ambient temperature. The overcurrent protection system 108 also eliminates the need for certain fuses depending on regulatory requirements. This improved performance is not possible with conventional fuses, circuit brakers, and overload-relay based systems.

The overcurrent protection system 108 eliminates the need to reset circuit breakers in the event of an overcurrent event. Instead, the motor affected by the overcurrent event may be turned off at the onset of the surge in current. The motor can then be restarted after the overcurrent event.

Additional Considerations

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. An overcurrent protection system for a mobile irrigation system including a plurality of drive motors and an electric pump motor powered via an electrical power distribution system including a plurality of electrical power distribution lines, a plurality of drive motor power branch lines, and a pump motor power branch line, the overcurrent protection system comprising:
   a plurality of control panels each including:
      a controller configured to:
         set a first current magnitude threshold according to a direct negative correlation to the ambient temperature;
         generate a motor control signal for activating one of the plurality of drive motors;
         transmit the motor control signal to the one of the plurality of drive motors;
         determine a current magnitude of electrical current passing through one of the plurality of drive motor power branch lines to the one of the plurality of drive motors; and
         restrict current to the one of the plurality of drive motors if the current magnitude is above the first current magnitude threshold; and
   a pump control panel including a controller configured to:
      generate a pump motor control signal to activate the electric pump motor;
      transmit the pump motor control signal to the electric pump motor;
      determine a current magnitude of electrical current passing through the pump motor power branch line to the electric pump motor; and
      restrict current to the electric pump motor if the current magnitude is above a second current magnitude threshold.

2. The overcurrent protection system of claim 1, each of the plurality of control panels further including a plurality of current measurement sensors for determining the current magnitude in the plurality of drive motor power branch lines.

3. The overcurrent protection system of claim 1, each of the plurality of control panels further including a plurality of motor controllers connected to the plurality of drive motor power branch lines and communicatively coupled to the controller of the control panel for restricting current to the one of the drive motors if the current magnitude is above the first current magnitude threshold.

4. The overcurrent protection system of claim 3, the controller of the control panel being configured to shut off electrical current to the one of the plurality of drive motors if the current magnitude is above the first current magnitude threshold.

5. The overcurrent protection system of claim 1, the controller of the control panel being further configured to set the first current magnitude threshold according to one of a plurality of motor operation stages.

6. The overcurrent protection system of claim 5, the controller of the control panel being further configured to increase the first current magnitude threshold if the one of the plurality of motor operation stages is a motor startup stage.

7. The overcurrent protection system of claim 1, the first current magnitude threshold having a time-based profile.

8. The overcurrent protection system of claim 1, the overcurrent protection system further comprising an ambient temperature measurement device for detecting ambient temperature.

9. The overcurrent protection system of claim 1, further comprising a wireless communication element configured to communicatively connect to a data network for remotely adjusting the first current magnitude threshold.

10. A mobile irrigation system comprising:
   a center pivot;
   a plurality of spans connected in series from the center pivot, each of the plurality of spans including:
      a conduit section configured to transport an irrigation fluid from a fluid source to a field;
      a truss configured to support the conduit section; and
      a mobile irrigation tower configured to move the truss and the conduit section across the field, the mobile irrigation tower including:
         a plurality of wheels for traversing the field; and
         a drive motor drivably connected to one of the plurality of wheels;
   an electrical power distribution system including:
      a plurality of electrical power distribution lines extending to the mobile irrigation towers for distributing electrical power to the drive motors; and
      a plurality of drive motor power branch lines electrically connecting the electrical power distribution lines to the drive motors; and
   an overcurrent protection system comprising:
      a main control panel including:
         a controller configured to generate a system control signal; and a plurality of fuses configured to provide electrical power distribution line protection;
a plurality of tower control panels each including:
a controller to:
set a first current magnitude threshold according to a direct negative correlation to the ambient temperature;
receive the system control signal from the controller of the main control panel;
generate a drive motor control signal to activate one of the drive motors based on the system control signal;
transmit the drive motor control signal to the one of the drive motors;
determine a current magnitude of electrical current passing through one of the drive motor power branch lines to the one of the drive motors; and
restrict current to the one of the drive motors if the current magnitude is above the first current magnitude threshold; and
a pump control panel including a controller configured to:
receive the system control signal from the controller of the main control panel;
generate a pump motor control signal to activate the electric pump motor based on the system control signal;
transmit the pump motor control signal to the electric pump motor;
determine a current magnitude of electrical current passing through the pump motor branch line to the electric pump motor; and
restrict current to the electric pump motor if the current magnitude is above a second current magnitude threshold.

11. The mobile irrigation system of claim 10, each of the plurality of tower control panels further including a plurality of current measurement sensors for determining the current magnitude from the plurality of drive motor power branch lines.

12. The mobile irrigation system of claim 10, each of the plurality of tower control panels including a plurality of motor controllers connected to the plurality of drive motor power branch lines and communicatively coupled to the controller of the tower control panel for restricting current to the one of the drive motors if the current magnitude is above the first current magnitude threshold.

13. The mobile irrigation system of claim 12, the controller of the tower control panel being configured to shut off electrical current to the one of the drive motors if the current magnitude is above the first current magnitude threshold.

14. The mobile irrigation system of claim 10, the controller of the tower control panel being further configured to set the first current magnitude threshold according to one of a plurality of motor operation stages.

15. The mobile irrigation system of claim 14, the controller of the tower control panel being further configured to increase the first current magnitude threshold if the one of the plurality of motor operation stages is a motor startup stage.

16. The mobile irrigation system of claim 10, the first current magnitude threshold having a time-based profile.

17. The mobile irrigation system of claim 10, the overcurrent protection system further comprising an ambient temperature measurement device for detecting ambient temperature.

18. The mobile irrigation system of claim 10, the overcurrent protection system further comprising a wireless communication element configured to communicatively connect to a data network for remotely adjusting the first current magnitude threshold.

19. A mobile irrigation system comprising:
a center pivot;
a plurality of spans connected in series from the center pivot, each of the plurality of spans including:
a conduit section configured to transport an irrigation fluid from a fluid source to a field;
a truss configured to support the conduit section; and
a mobile irrigation tower configured to move the truss and the conduit section across the field, the mobile irrigation tower including:
a plurality of wheels for traversing the field; and
a drive motor drivably connected to one of the plurality of wheels;
a pump including an electric pump motor;
an electrical power distribution system including:
a plurality of electrical power distribution lines extending to the mobile irrigation towers for distributing electrical power to the drive motors; and
a plurality of drive motor power branch lines electrically connecting the electrical power distribution lines to the drive motors; and
a pump motor power branch line electrically connecting the electrical power distribution lines to the pump motor; and
an overcurrent protection system comprising:
an ambient temperature measurement device for detecting ambient temperature;
a main control panel mounted on the center pivot, the main control panel including:
a controller configured to generate a system control signal; and
a plurality of fuses configured to provide electrical power distribution line protection;
a plurality of tower control panels each including:
a plurality of current measurement sensors for determining the current magnitude from the plurality of plurality of drive motor power branch lines; and
a controller configured to:
set a first current magnitude threshold according to a direct negative correlation to the ambient temperature;
receive the system control signal from the controller of the main control panel;
generate a drive motor control signal to activate one of the drive motors based on the system control signal;
transmit the drive motor control signal to the one of the drive motors;
determine a current magnitude of electrical current passing through one of the drive motor power branch lines to the one of the drive motors via one of the plurality of current measurement sensors; and
restrict current to the one of the drive motors if the current magnitude is above the first current magnitude threshold;
a pump control panel including a controller configured to:
receive the system control signal from the controller of the main control panel;

generate a pump motor control signal to activate the electric pump motor based on the system control signal;
transmit the pump motor control signal to the electric pump motor;
determine a current magnitude of electrical current passing through the pump motor branch line to the electric pump motor; and
restrict current to the electric pump motor if the current magnitude is above a second current magnitude threshold; and
a wireless communication element configured to communicatively connect to a data network for remotely adjusting the current magnitude threshold.

* * * * *